United States Patent [19]

Chapdelaine et al.

[11] Patent Number: 4,938,971
[45] Date of Patent: Jul. 3, 1990

[54] FLUID FRUIT JUICE AND EDIBLE PLASTICIZER COMPOSITION HAVING LOW MOISTURE CONTENT

[75] Inventors: Albert H. Chapdelaine, Naperville; Michael R. Dzija, Chicago, both of Ill.

[73] Assignee: Wm. Wrigley Jr. Company, Chicago, Ill.

[21] Appl. No.: 213,081

[22] Filed: Jun. 29, 1988

[51] Int. Cl.$^5$ ................................................. A23L 2/02
[52] U.S. Cl. ........................................ 426/3; 426/443; 426/599; 426/640
[58] Field of Search .................... 426/615, 102, 6, 5, 426/4, 640, 443

[56] References Cited

U.S. PATENT DOCUMENTS

| | | | |
|---|---|---|---|
| 2,704,256 | 3/1955 | Weiss | 99/78 |
| 3,395,021 | 7/1968 | Glicksman et al. | 99/78 |
| 3,632,358 | 1/1972 | Echeandia et al. | 99/135 |
| 3,715,216 | 2/1973 | Wuhrmann et al. | 99/78 |
| 3,894,154 | 7/1975 | Graff et al. | 426/282 |
| 3,920,849 | 11/1975 | Marmo | 426/3 |
| 3,953,615 | 4/1976 | Gupta | 426/658 |
| 4,001,438 | 1/1977 | Marmo | 426/96 |
| 4,013,593 | 3/1977 | Shaffer | 252/522 |
| 4,117,176 | 9/1978 | Taylor et al. | 426/660 |
| 4,163,807 | 8/1979 | Jackman | 426/599 |
| 4,235,936 | 11/1980 | Kahn et al. | 426/590 |
| 4,241,091 | 12/1980 | Stroz et al. | 426/4 |
| 4,252,829 | 2/1981 | Terrevazzi | 426/5 |
| 4,259,355 | 3/1981 | Marmo et al. | 426/651 |
| 4,399,153 | 8/1983 | Tezuka et al. | 426/5 |
| 4,433,000 | 2/1984 | De Leon et al. | 426/599 |
| 4,479,971 | 10/1984 | Eng et al. | 426/330 |
| 4,515,822 | 5/1985 | Kraig et al. | 426/625 |
| 4,582,707 | 4/1986 | Calabro | 426/4 |
| 4,612,205 | 9/1986 | Kapper et al. | 426/590 |
| 4,671,961 | 6/1987 | Patel et al. | 426/3 |
| 4,671,967 | 6/1987 | Patel et al. | 426/658 |
| 4,713,291 | 12/1987 | Sasaki | 428/373 |
| 4,728,515 | 3/1988 | Patel et al. | 426/3 |
| 4,735,803 | 4/1988 | Katz | 424/195.1 |
| 4,847,292 | 7/1989 | Katz | 514/526 |
| 4,853,413 | 8/1989 | Katz | 514/526 |

FOREIGN PATENT DOCUMENTS

| | | |
|---|---|---|
| 3523043 | 1/1986 | Fed. Rep. of Germany . |
| 53-127858 | 11/1978 | Japan . |
| 55-15748 | 2/1980 | Japan ................................. 426/599 |
| 57-105187 | 6/1982 | Japan . |
| 61-63245 | 4/1986 | Japan . |
| 61-140510 | 6/1986 | Japan . |

OTHER PUBLICATIONS

Grant, 1969 Hackh's Chemical Dictionary, 4th Edition, McGraw-Hill Book Co., New York, pp. 384, 534, 550.
D. D. Duxbury, "Decolorized-Deflavoring-Reduced Acid Fruit Juice Concentrates", *Food Processing*, 84 (Nov. 1986).
E. Grampp, "Hot Clarification Process Improves Production of Apple Juice Concentrate", *Food Technology*, 34–41 (Nov. 1977).
R. Heiss et al., "Fundamentals of Freeze-Concentration of Liquids", *Food Technology*, 5, 211-18 (1951).
R. Lees and E. B. Jackson, *Sugar Confectionery and Chocolate Manufacture* (1973), pp. 45, 99, 239, 281, 292, 336, 339 and 358–359.
The Merck Index, 1983, Tenth Edition, Merck & Co., Inc., Rahway, N.J., pp. 644, 1130, 1131.

Primary Examiner—Carolyn Paden
Attorney, Agent, or Firm—Willian, Brinks, Olds, Hofer, Gilson & Lione

[57] ABSTRACT

Fruit juices are concentrated to low moisture levels (below about 25 percent, and preferably as low as about 2 percent moisture content) without excessive increases in viscosity or loss of flavor by adding an edible plasticizer such as glycerin, propylene glycol or a mixture thereof, to a fruit juice or fruit juice concentrate, and evaporating most of the moisture from the concentrate-plasticizer mixture. The resulting fruit juice solids-plasticizer mixture can be used as an additive for chewing gum, foods, or concentrated fruit juice compositions for reconstitution in water to form beverages.

24 Claims, No Drawings 4,938,971

FLUID FRUIT JUICE AND EDIBLE PLASTICIZER COMPOSITION HAVING LOW MOISTURE CONTENT

BACKGROUND OF THE INVENTION

This invention relates to fluid fruit juice. More particularly, it relates to fruit juice concentrates containing less than about 25 per cent and as little as about 2 per cent moisture content, and containing an edible plasticizing agent (or "plasticizer") such as glycerin or propylene glycol, the ratio of fruit juice concentrate solids to plasticizing agent being between about 0.5:1 and about 100:1.

Normal fruit juice concentrates contain at least about 30 per cent moisture. Further evaporation of moisture from the juice concentrate leads to problems because of the increase in viscosity and because further evaporation of moisture requires much more heat, which is detrimental to the flavor of the fruit juice. It would be desirable to use fruit juices to flavor and enhance chewing gum and food and beverage products containing low moisture content. However, for chewing gum and some other products, incorporation of fruit juice concentrates containing about 30 per cent (or more) moisture means either that the amount of fruit juice added is too low to be an effective additive, or the amount of moisture added is too high to allow the chewing gum or other product to have the proper texture. In other words, there is a need for a fruit juice concentrate which can be added to chewing gum and food and beverage products, which has a low moisture content, does not have an unacceptably high viscosity, and does not suffer from the flavor degradation associated with reduction of moisture content of fruit juice concentrates below about 30 per cent moisture.

De Leon et al., in U.S. Pat. No. 4,433,000, issued Feb. 21, 1984, disclose fruit juice-containing products, and in particular, a method for eliminating or minimizing the separation of solids in such products. The stabilizer system comprises a mixture of propylene glycol alginates, i.e., the water-soluble propylene glycol ester of an alginic acid; and sodium carboxymethyl cellulose, a synthetic water-soluble ether of cellulose.

Terrevazzi, in U.S. Pat. No. 4,252,829, issued Feb. 24, 1981, discloses a flavored liquid filing composition for chewing gum comprising an aqueous solution of sugars containing 75 per cent solids, 8 to 13 per cent of liquid sorbitol, and 2 to 5 per cent solution of flavoring in propylene glycol.

Wuhrmann et al., in U.S. Pat. No. 3,715,216, issued Feb. 6, 1973, disclose powder compositions adapted to be reconstituted in cold water to provide refreshing beverages of which the flavor and appearance resemble fruit juices.

Calabro, in U.S. Pat. No. 4,582,707, issued Apr. 15, 1986, discloses a chewing gum made with hydrogenated starch hydrolyzate, alone or with glycerin, to which carboxymethyl cellulose is added to reduce the tendency of the chewing gum to become sticky.

Eng et al., in U.S. Pat. No. 4,479,971, issued Oct. 30, 1984, disclose an emulsion of a glyceride fat for use as a clouding agent for beverages.

Gupta et al., in U.S. Pat. No. 3,953,615, issued Apr. 27, 1976, disclose a hydration drying process for producing an improved free-flowing, non-hygroscopic food an/or beverage powder. The process involves mixing juice concentrate with anhydrous dextrose in an agitating device.

Jackman, in U.S. Pat. No. 4,163,807, issued Aug. 7, 1979, discloses adding xanthan gum and carboxymethyl cellulose to fruit juices to improve their appearance, taste and stability.

Glicksman et al., in U.S. Pat. No. 3,395,021, issued Jul. 30, 1968, disclose a fruit beverage powder containing a water-soluble and water-swellable gum, so that the powder when dissolved in water has a pulpy mouth feel, similar to natural fresh fruit beverages.

Graff et al., in U.S. Pat. No. 3,894,154, issued Jul. 8, 1975, disclose a chewing gum piece having an enclosed cavity filled with liquid containing dissolved solids and glycerin.

Patel et al., in U.S. Pat. No. 4,728,515, issued Mar. 1, 1988, and in U.S. Pat. Nos. 4,671,961 and 4,671,967, issued Jun. 9, 1987, disclose low moisture chewing gums containing a dehydrated mixture of an aqueous syrup of carbohydrate solids and a plasticizer which is glycerin, propylene glycol or a mixture thereof.

Grampp, in "Hot Clarification Process Improves Production of Apple Juice Concentrate", *Food Technology*, 38–41 (Nov. 1977), discloses a hot clarification process for apple juice, and also conventional fruit juice concentration techniques.

Duxberry, in "Decolorized-deflavorized-reduced acid fruit juice concentrates", *Food Processing*, 84 (Nov. 1986), describe fruit juice concentrates made from 100 per cent fruit by an undisclosed process for removing flavor and color, as well as reducing the acid content. The processed fruit juice concentrates retain virtually all of the natural sweetness, nutrients and vitamins of the fruit. An alternate process reducing only the color and flavor is mentioned, but not disclosed.

SUMMARY OF THE INVENTION

The present invention provides a pourable fluid fruit juice concentrate-plasticizer composition for use as an additive to chewing gum or foods, comprising:

(a) a fruit juice concentrate;

(b) a plasticizer selected from the group consisting of glycerin, propylene glycol and mixtures thereof;

(c) wherein the ratio of fruit juice concentrate solids to plasticizer is between about 0.5:1 and about 100:1;

(d) wherein the moisture (water) content of the fruit juice concentrate-plasticizer composition is from about 2 per cent to about 25 per cent; and (e) wherein the fruit juice concentrate-plasticizer composition is in a fluid condition.

The present invention also provides a chewing gum containing from about 1 to about 30 per cent by weight of such a fruit juice concentrate-plasticizer composition; a food product containing from about 1 to about 30 per cent by weight of such a fruit juice concentrate-plasticizer composition; and a concentrated fruit juice composition for reconstitution in water to form a beverage, containing from about 1 to about 80 per cent by weight of such a fruit juice concentrate-plasticizer composition.

According to the invention, fruit juices are concentrated to low moisture levels (below about 25 per cent, and preferably as low as about 2 per cent moisture content) without excessive increases in viscosity or excessive flavor degradation by adding an edible plasticizer such as glycerin, propylene glycol or a mixture thereof, to a fruit juice or preferably a fruit juice concentrate, and evaporating most of the moisture from the concentrate-plasticizer mixture. The resulting fruit juice solids-plasticizer mixture can be used as an additive for chewing gum, foods, or concentrated fruit juice compositions for reconstitution in water to form beverages.

All types of fruit juices can be used. The fruit juice solids-plasticizer mixture can be used in chewing gums which have, even after the addition of the mixture, sufficiently low moisture content that they have a good firm texture and good stability. They can also be used in other products such as foods, confectionery products and the like which are sensitive to high levels of moisture content.

At least a sixth, preferably at least half, more preferably at least two thirds, and most preferably at least five sixths of the moisture initially present in the fruit juice concentrate-plasticizer composition is evaporated.

Preferably the moisture content of the fruit juice concentrate-plasticizer composition is less than about 25 per cent; more preferably, less than about 15 per cent; still more preferably, less than about 10 per cent; and still more preferably, less than about 5 per cent, as low as about 2 percent.

Preferably the ratio of fruit juice concentrate solids to plasticizer is between about 0.75:1 and about 40:1; more preferably, between about 2:1 and about 30:1.

DETAILED DESCRIPTION

A conventional process for making apple juice concentrate (partly described by Grampp in the *Food Technology* article cited above) is discussed below. Similar technology is used to produce other types of concentrated fruit juice.

Apple juice is obtained from apples by pressing out the juice in a horizontal press and centrifuging the juice to remove excess pulp. This is normally done at room temperature or below. The juice is then heated to about 92° C. for about 15-30 minutes to strip off the flavor essences. This deodorizes the fruit juice and also gives additional flavoring agents as flavor ingredients for sale by the manufacturer. Most often, essences are added back to the fruit juice to give a complete fruit juice or concentrate.

After the essences are stripped, the soluble pectin and starch (if present) are fermented. The temperature is lowered to 50° C. for about two hours and the juice is treated with enzymes to ferment (i.e., degrade) the soluble pectin. If starch is present, the juice may be enzyme treated at 30° C. to ferment both the starch and the pectin.

After fermentation the juice is cooled to about 8°-20° C. and flocculating agents are added to remove any suspended matter. This takes several more hours of processing at 8°-20° C. Activated carbon is then added to decolorize and refine the juice. The juice is then filtered.

After filtering, the clear juice is reheated to 50° C. to concentrate it. Concentration is done in a three-stage evaporator. As water evaporates, the temperature increases and the juice becomes more and more concentrated. As it becomes more concentrated, the boiling point increases and more heat is needed to evaporate the remaining water. The fruit juice is concentrated to about 70°-72° Brix or about 70% solids and about 30% moisture. The juice concentrate has the consistency of a light syrup.

In this invention, glycerin or another edible plasticizer is added to the fruit juice during the juice processing. The plasticizer may be added anywhere in the process; for example, it may be added after the juice is refined, just before evaporation. Another preferred time to add the plasticizer is after the juice has already been evaporated to 70% solids. With the plasticizer present, more heat is required to evaporate the remaining moisture. Thus, later addition of plasticizer is more energy efficient.

A primary use of the juice-concentrate plasticizer mixture of the present invention is as an additive for chewing gum. The present invention utilizes conventional chewing compositions for this purpose.

In general, a chewing gum composition typically comprises a water soluble bulk portion and a water insoluble chewable gum base portion and, typically water insoluble flavoring agents. The water soluble portion dissipates with a portion of the flavoring agent over a period of time during chewing. The gum base portion is retained in the mouth throughout the chew.

The insoluble gum base generally comprises elastomers, resins, fats and oils, waxes, softeners and inorganic fillers. Elastomers may include polyisobutylene, isobutylene-isoprene copolymer, styrene butadiene rubber as well as natural latexes such as chicle. Resins include polyvinyl acetate and terpene resins. Fats and oils may also be included in the gum base, including tallow, hydrogenated and partially hydrogenated vegetable oils, and cocoa butter. Commonly employed waxes such as beeswax and carnauba. According to the preferred embodiment of the present invention the insoluble gum base constitutes between about 5 to about 95 percent by weight of the gum. More preferably the insoluble gum base comprises between 10 and 50 percent by weight of the gum and most preferably about 20 to about 35 percent by weight of the gum.

The gum base typically also includes a filler component. The filler component such as calcium carbonate, magnesium carbonate, talc, dicalcium phosphate and the like. The filler may constitute between about 5 to about 60 percent by weight of the gum base. Preferably, the filler comprises about 10 to about 50 percent by weight of the gum base.

Gum bases typically also contain softeners, including glycerol monostearate and glycerol triacetate. Further gum bases may also contain optional ingredients such as antioxidants, colors and emulsifiers. The present invention contemplates employing any commercially acceptable gum base.

The water soluble portion comprises primarily sweet bulking agents which are powdered sugars or sugar alcohols such as sucrose, glucose, dextrose, fructose, lactose, sorbitol, mannitol, xylitol, and the like.

The water soluble portion of the chewing gum may further comprise softeners, sweeteners, flavoring agents and combinations thereof. Softeners are added to the chewing gum in order to optimize the chewability and mouth feel of the gum. Softeners, also known in the art as plasticizers or plasticizing agents, generally constitute between about 0.5 to about 15.0 percent by weight of the chewing gum. Softeners contemplated by the present invention include glycerin, lecithin, and combinations thereof Further, aqueous sweetener solutions such as those containing sorbitol, hydrogenated starch hydrolyzates, corn syrup and combinations thereof may be used as softeners and binding agents in gum. The present invention can be used as partial or complete replacement for softeners and plasticizers.

The present invention can be used in sugarless gum formulations or formulations containing sugar. Sugar sweeteners generally including saccharide components commonly known in the chewing gum art which comprise but are not limited to sucrose, dextrose, maltose, dextrin, dried invert sugar, fructose, levulose, galactose, corn syrup solids, and the like, alone or in any combination. Sugarless sweeteners include components with sweetening characteristics but are devoid of the commonly known sugars. Sugarless sweeteners may comprise sugar alcohols such as sorbitol, mannitol, xylitol, hydrogenated starch hydrolyzates, maltitol, and the like, alone or in any combination. The sugar alcohols function not only as sweeteners for sugarless gums, but as bulking agents, i.e., a water-soluble component of the gum base which provides bulk. A preferred sugarless sweetener which does not function as a bulking agent, and may be used in the core portion or in the rolling compound, is the dipeptide sweetener aspartame (L-aspartyl-L-phenylalanine methyl ester, disclosed in U.S. Pat. Nos. 3,492,131, issued Jan. 27, 1970, to Schlatter, and 3,642,491, issued Feb. 15, 1972, to Schlatter) in an amount of about 0.025 percent to about 0.5 percent, but preferably about 0.3 percent, by weight of the chewing gum product. A natural high-potency sweetener with flavor enhancing properties, which may likewise be used either in the core portion or in the rolling compound, is glycyrrhizin. Other high potency sweeteners, whether artificial or natural, can also be used.

A flavoring agent, in addition to the fruit juice concentrate-plasticizer additive, may be present in the chewing gum in an amount within the range of from about 0.1 to about 10.0 weight percent of the gum. The flavoring agents may comprise essential oils, synthetic flavors, or mixture thereof including but not limited to oils derived from plants and fruits such as citrus oils, fruit essences, peppermint oil, spearmint oil, clove oil, oil of wintergreen, anise, and the like. Artificial flavoring components are also contemplated. Those skilled in the art will recognize that natural and artificial flavoring agents may be in any sensorally acceptable blend. All such flavors and flavor blends are contemplated by the present invention.

Optional ingredients such as colors, emulsifiers and pharmaceutical agents may be added to the chewing gum.

In general, chewing gum is manufactured using the well-known method of sequentially combining the various chewing gum ingredients in a commercially available mixer known in the art. After the ingredients have been thoroughly mixed, the gum mass is discharged from the mixer and shaped into the desired form such as by rolling into sheets and cutting into sticks, extruding into chunks or casting into pellets.

Generally, the ingredients are mixed by first melting the gum base and adding it to the running mixer. The base may also be melted in the mixer itself. Color or emulsifiers may also be added at this time. A softener such as glycerin may also be added at this time along with syrup and a portion of bulking agent. Further portions of the bulking agent may then be added to the mixer. A flavoring agent is typically added with the final portion of the bulking agent.

The entire mixing procedure typically takes from five to fifteen minutes, but longer mixing times may sometimes be required. Those skilled in the art will recognize that many variations of the above described procedure may be followed.

A fruit juice concentrate containing 70 per cent solids and 30 per cent moisture typically has the viscosity of a light syrup. At room temperature, the fruit juice concentrate-plasticizer composition of the present invention, at about 70 per cent solids, about 25 per cent glycerin, and less than 5 per cent moisture, is a heavy syrup that is still pourable. If it were possible to evaporate a fruit juice to more than 95 per cent solids and less than 5 per cent moisture, the product would be a glassy solid that is not pourable. Thus the use of a plasticizer, according to the present invention, allows a fruit juice to have its moisture content to be reduced to as little as about 2 per cent without excessive viscosity increases, so that the product retains its pourability and also is not degraded in taste.

Fruit juices need to be refrigerated to reduce spoilage by microbiological growth. The use of glycerin to make the inventive product slows down microbiological growth and improves shelf life stability and may allow storage at temperatures above freezing.

The invention will now be illustrated with Examples.

EXAMPLE 1

An apple juice concentrate containing about 30 per cent moisture content and 70 per cent solids, which had been deodorized, decolorized and reduced in acid content, by standard fruit juice concentrating procedures, was mixed with glycerin, in a ratio of 20 parts glycerin to 80 parts apple juice concentrate. The mixture was further concentrated in a vacuum evaporator starting at about 70° C. and evaporating moisture until it contained about 71 per cent apple juice solids, about 25 per cent glycerin, and 4.1 per cent moisture.

The deodorized, decolorized and reduced acid and moisture content concentrate-glycerin mixture (20 parts) was blended with 3 parts lemon juice, 1 part strawberry juice concentrate (70 per cent solids 30 per cent moisture content) and 1 part apple juice concentrate (70 per cent solids 30 per cent moisture content). The resulting fruit juice additive blend was used in Composition C, described below.

For comparison, a similar juice blend was made with a standard deodorized, decolorized and reduced-acid content juice concentrate that was not reduced moisture content with glycerin. This juice blend was used in Composition B.

It is considered that in order to give a chewing gum a significant amount of fruit juice, at least 5 per cent fruit juice is needed. A standard gum formula (Composition A, a control), an experimental fruit juice gum (Composition B), and an experimental reduced moisture content fruit juice gum (Composition C), were made according to the following formulas:

| INGREDIENT | COMPOSITION A | COMPOSITION B | COMPOSITION C |
|---|---|---|---|
| Bubble Gum Base | 20.0% | 20.0% | 20.0% |
| Sucrose | 56.0 | 56.15 | 57.35 |
| Corn Syrup | 20.95 | 16.0 | 16.0 |
| Separately added glycerin | 1.4 | 1.2 | —* |
| Lecithin | 0.5 | 0.5 | 0.5 |
| Malic Acid | 0.4 | 0.4 | 0.4 |
| Strawberry Flavor | 0.6 | 0.6 | 0.6 |
| Color | 0.15 | 0.15 | 0.15 |
| Conventional Fruit Juice Concentrate Blend, as described above | — | 5.0 | — |
| Reduced Moisture Content Fruit Juice Additive Blend as described above | — | — | 5.0 |

| INGREDIENT | COMPOSITION A | COMPOSITION B | COMPOSITION C |
|---|---|---|---|
| Total | 100.00 | 100.00 | 100.00 |

*Composition C contained about 1.0 percent glycerin added as part of the Reduced Moisture Content Fruit Juice Additive Blend.

Composition B, made with conventional fruit juice concentrate and containing about 1.5 per cent more moisture in the final gum product, was extremely soft in texture and difficult to process. Composition A, the control, and Composition C, the gum made with a dehydrated juice concentrate-glycerin blend, had similar, good, workable textures. Composition B was extremely soft and not processable. Composition C had a pleasant strawberry flavor, with a good fruity impact. Compared to the control, flavor was judged juicier with more berry type flavor notes. This shows that when moisture in fruit juice concentrate is evaporated from a fruit juice concentrate-edible plasticizer mixture, good quality gums can be obtained; but that 1.5 per cent more moisture in the gum, added as part of a fruit juice concentrate to the gum, destroys the gum texture.

EXAMPLE 2

This example demonstrates that standard fruit juice concentrates, which are not deodorized, decolorized or reduced in acid content, can also be reduced in moisture content with the addition of glycerin and used to make acceptable quality gum. A reduced moisture content fruit juice/glycerin mixture was prepared in the same manner as in Example 1, except that a standard concentrated apple juice was used instead of deodorized, decolorized and reduced acid content, concentrated apple juice. Also, the mixture used in this example was evaporated to 2.5% moisture. The 2.5% moisture sample was then used to make a bubble gum by the following formula to compare concentrated apple juice added directly to gum (Composition D) to dehydrated fruit juice added to gum (Composition E).

| INGREDIENT | COMPOSITION D | COMPOSITION E |
|---|---|---|
| Bubble Gum Base | 20.0% | 20.0% |
| Sucrose | 56.55 | 56.55 |
| Corn Syrup | 16.0 | 16.0 |
| Lecithin | 0.5 | 0.5 |
| Malic Acid | 0.4 | 0.4 |
| Modified Strawberry Flavor | 1.4 | 1.4 |
| Color | 0.15 | 0.15 |
| Conventional Concentrated Apple Juice (70% solids, 30% moisture) | 5.0 | — |
| Dehydrated Apple Juice (70% solids, 27.5% glycerin and 2.5% moisture) | — | 5.0 |
| Total | 100.00 | 100.00 |

Composition D, made with conventional fruit juice concentrate and containing about 1.5 per cent more moisture in the final gum product than Composition E, was extremely soft in texture and difficult to process, and did not yield an acceptable gum product. Even though Composition E has 1.5 per cent glycerin added to it via the dehydrated apple juice, Composition E has a texture typical of standard bubble gum, and could be processed like a typical standard bubble gum. Both compositions had good flavor impact with good juicy, fruit flavor notes and had no flavor off notes.

EXAMPLE 3

To demonstrate that the dehydrated fruit juice/plasticizer mixture could be reconstituted in water to form a beverage, two solutions were prepared:

1. Beverage F was reconstituted apple juice made by mixing one part conventional concentrated apple juice (used in Composition D of Example 2) to six parts water.
2. Beverage G was reconstituted apple juice made by mixing one part reduced moisture content apple juice/glycerin blend (used in Composition E of Example 2) to six parts water.

Both reconstituted beverages were sensory tested and compared. Beverage F had the typical tart, fruity, apple juice flavor. Beverage G has a very similar flavor, but was subdued, less tart and slightly sweeter. Beverage G gave an acceptable flavor and could be used in beverages where an apple juice concentrate is used as part of the beverage composition.

EXAMPLE 4

As noted previously, the dehydrated fruit juice concentrate may be used as partial replacement of corn syrup in other types of confectionery. The following is an example of a soft fruit pastille confectionery item (modified from a formula given for "Soft Fruit Pastilles" at page 239 of R. Lees and E. B. Jackson, *Sugar Confectionery and Chocolate Manufacture*, 1973), where the reduced moisture content fruit juice concentrate may be used:

|  | Conventional Formula | Invention Formula |
|---|---|---|
| Sucrose | 14.0% | 14.0% |
| Corn Syrup, Having a Dectrose Equivalent of 42 | 21.5 | 18.0 |
| 30 Fluidity Thin Boiling Starch | 6.0 | 6.0 |
| Water | 52.0 | 52.0 |
| Jam* | 5.0 | 5.0 |
| Color, Flavor, Acid | As required | As required |
| Glycerin** | 1.5 | — |
| Reduced Moisture Content Fruit Juice/Plasticizer*** | — | 5.0 |
| Total | 100.0 | 100.0 |

*Jam is made by boiling 50% sucrose and 50% fruit pulp.
**Glycerin is added to retain moisture and retain softness during product storage.
***Contains 70% fruit juice solids, 28% glycerin and 2% water.

The following is the general procedure for making the soft fruit pastilles:

1. Boil sugar and syrup with two thirds of the water in a steam jacketed pan.
2. Prepare a starch slurry using the remaining water.
3. Slowly add the starch slurry to the boiling sugar mixture, the speed of addition being such as not to cause the mixture to cease boiling.
4. Add jam that is prepared from boiled sugar/fruit pulp.
5. Continue cooking until the necessary consistency is reached.
6. Add glycerin or fruit juice/plasticizer.
7. Add color, flavor and acid solution.
8. Deposit into starch impressions and store in a hot room for twenty-four hours.

The inventive composition adds fruit juice without additional water and will make a product similar in texture to the conventional soft fruit pastille.

We claim:

1. A pourable fluid fruit juice concentrate-plasticizer composition for use as an additive to chewing gum or foods, consisting essentially of:
   (a) a fluid fruit juice concentrate; and
   (b) a plasticizer selected from the group consisting of glycerin, propylene glycol and mixtures thereof;
   (c) wherein the ratio of fluid fruit juice concentrate solids to plasticizer is between about 0.5:1 and about 100:1;
   (d) wherein the moisture content of the fruit juice concentrate-plasticizer composition is from about 2 per cent to about 25 percent; and
   (e) wherein the fruit juice concentrate-plasticizer composition is in a fluid condition.

2. A fruit juice concentrate-plasticizer composition according to claim 1, wherein at least one sixth of the moisture initially present in the fruit juice concentrate-plasticizer composition has been evaporated.

3. A fruit juice concentrate-plasticizer composition according to claim 1, wherein at least half of the moisture initially present in the fruit juice concentrate-plasticizer composition has been evaporated.

4. A fruit juice concentrate-plasticizer composition according to claim 1, wherein at least two thirds of the moisture initially present in the fruit juice concentrate-plasticizer composition has been evaporated.

5. A fruit juice concentrate-plasticizer composition according to claim 1, wherein at least five sixths of the moisture initially present in the fruit juice concentrate-plasticizer composition has been evaporated.

6. A fruit juice concentrate-plasticizer composition according to claim 1, wherein the moisture content of the fruit juice concentrate-plasticizer composition is less than about 15 per cent.

7. A fruit juice concentrate-plasticizer composition according to claim 1, wherein the moisture content of the fruit juice concentrate-plasticizer composition is less than about 10 per cent.

8. A fruit juice concentrate-plasticizer composition according to claim 1, wherein the moisture content of the fruit juice concentrate-plasticizer composition is less than about 5 per cent.

9. A fruit juice concentrate-plasticizer composition according to claim 1, wherein the moisture content of the fruit juice concentrate-plasticizer composition is about 2 per cent.

10. A fruit juice concentrate-plasticizer composition according to claim 1, wherein the plasticizer is glycerin.

11. A fruit juice concentrate-plasticizer composition according to claim 1, wherein the plasticizer is propylene glycol.

12. A fruit juice concentrate-plasticizer composition according to claim 1, wherein the ratio of fruit juice concentrate solids to plasticizer is between about 0.75:1 and about 40:1.

13. A fruit juice concentrate-plasticizer composition according to claim 1, wherein the ratio of fruit juice concentrate solids to plasticizer is between about 2:1 and about 30:1.

14. A chewing gum containing from about 1 to about 30 per cent by weight of the fruit juice concentrate-plasticizer composition of claim 1.

15. A food product containing from about 1 to about 30 per cent by weight of the fruit juice concentrate-plasticizer composition of claim 1.

16. A process for preparing a pourable fluid fruit juice concentrate-plasticizer composition for use as an additive to chewing gum or foods, comprising the steps of:
   (a) adding an edible plasticizer to a fruit juice or a fruit juice concentrate, and
   (b) evaporating moisture from the combined plasticizer and fruit juice or fruit juice concentrate; but
   (c) wherein the moisture content in the composition after said evaporation, is between about 2 per cent and about 25 percent; and
   (d) wherein the fruit juice concentrate-plasticizer composition is in a pourable condition, after the evaporation of moisture from the combined plasticizer and fruit juice or fruit juice concentrate.

17. A process according to claim 16, wherein the edible plasticizer is glycerin, propylene glycol or a mixture thereof.

18. A process according to claim 16, wherein the edible plasticizer is glycerin.

19. A process according to claim 16, wherein the edible plasticizer is added to a fruit juice concentrate.

20. A process according to claim 19, wherein at least one sixth of the moisture initially present in the fruit juice concentrate-plasticizer composition is evaporated.

21. A process according to claim 19, wherein at least one half of the moisture initially present in the fruit juice concentrate-plasticizer composition is evaporated.

22. A process according to claim 19, wherein at least two thirds of the moisture initially present in the fruit juice concentrate-plasticizer composition is evaporated.

23. A process according to claim 20, wherein at least five sixths of the moisture initially present in the fruit juice concentrate-plasticizer composition is evaporated.

24. A concentrated fruit juice composition for reconstitution in water to form a beverage, containing from about 1 to about 80 percent by weight of an evaporated fruit juice concentrate-plasticizer composition prepared according to the process of claim 17.

* * * * *

UNITED STATES PATENT AND TRADEMARK OFFICE
CERTIFICATE OF CORRECTION

PATENT NO. : 4,938,971

DATED : July 3, 1990

INVENTOR(S) : Albert H. Chapdelaine et al.

It is certified that error appears in the above-identified patent and that said Letters Patent is hereby corrected as shown below:

In column 1, line 68, please delete "an/or" and substitute therefor --and/or--.

In column 4, line 26, after "employed" please insert --are--.

In column 4, lines 34 and 35, please delete "component. The filler".

In column 4, line 60, after "thereof" please insert --.--.

In column 8, line 26, please delete "dehydrated" and substitute therefor --reduced moisture content--.

Signed and Sealed this

Twenty-sixth Day of January, 1993

*Attest:*

DOUGLAS B. COMER

*Attesting Officer*   Acting Commissioner of Patents and Trademarks